United States Patent
Laney et al.

(10) Patent No.: US 6,846,606 B1
(45) Date of Patent: Jan. 25, 2005

(54) PHOSPHOR SCREEN AND IMAGING ASSEMBLY WITH POLY(LACTIC ACID) SUPPORT

(75) Inventors: Thomas M. Laney, Spencerport, NY (US); Peter T. Aylward, Hilton, NY (US); David J. Steklenski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/719,728

(22) Filed: Nov. 21, 2003

(51) Int. Cl.$^7$ .............. G03C 1/765; G03C 1/795; G03C 5/17; G03B 11/00; G03B 42/04

(52) U.S. Cl. .............. 430/139; 430/496; 430/502; 430/966; 250/482.1; 378/185; 428/314.4; 428/315.5

(58) Field of Search .............. 430/139, 502, 430/496, 966; 250/482.1; 378/185; 428/314.4, 315.5

(56) References Cited

U.S. PATENT DOCUMENTS

| | | |
|---|---|---|
| 4,912,333 A | 3/1990 | Roberts et al. |
| 5,405,887 A | 4/1995 | Morita et al. |
| 5,443,780 A | 8/1995 | Matsumoto et al. |
| 5,766,748 A * | 6/1998 | Ikado et al. .............. 428/220 |

FOREIGN PATENT DOCUMENTS

| | | |
|---|---|---|
| JP | 9-208817 | 8/1997 |
| JP | 2002-146-71 | 5/2002 |
| WO | WO 02/087877 A1 | 7/2002 |

OTHER PUBLICATIONS

U.S. Appl. No. 10/706,524 (D–86374), by Laney et al., titled *Phosphor Screen and Imaging Assembly*, filed Nov. 12, 2003.
U.S. Appl. No. 10/462,531, by Dagan et al., titled *Imaging Media With High Elastic Modulus and Improved Long Term Stability.*
*Poly(lactide): a Natural "Green" Alternative for Plastic Packaging Materials*, by Rafael Auras, Bruce Harte and Susan Selke.
JP Abstract 2001–059029 (Jun. 3, 2001).
JP Abstract 2001–219522 (Aug. 14, 2001).

* cited by examiner

Primary Examiner—Richard L. Schilling
(74) Attorney, Agent, or Firm—J. Lanny Tucker

(57) ABSTRACT

A phosphor screen comprises an inorganic phosphor capable of absorbing X-rays and emitting electromagnetic radiation having a wavelength greater than 300 nm. The phosphor is disposed on a support that has a reflective substrate comprising a continuous poly(lactic acid) first phase and a second phase dispersed within the continuous poly(lactic acid) first phase. The second phase contains microvoids that in turn contain barium sulfate particles. This support provides improved reflectivity particularly at shorter wavelengths.

21 Claims, 3 Drawing Sheets

US 6,846,606 B1

PHOSPHOR SCREEN AND IMAGING ASSEMBLY WITH POLY(LACTIC ACID) SUPPORT

FIELD OF THE INVENTION

This invention relates to new and improved fluorescent or phosphor screens (or radiographic phosphor panels) used in imaging from X-radiation in radiography. In particular, it relates to screens having highly reflective poly(lactic acid) supports that provide improved reflectivity particularly at shorter wavelengths.

BACKGROUND OF THE INVENTION

In conventional medical diagnostic imaging, the object is to obtain an image of a patient's internal anatomy with as little X-radiation exposure as possible. The fastest imaging speeds are realized by mounting a dual-coated radiographic element between a pair of fluorescent intensifying screens for imagewise exposure. About 5% or less of the exposing X-radiation passing through the patient is adsorbed directly by the latent image forming silver halide emulsion layers within the dual-coated radiographic element. Most of the X-radiation that participates in image formation is absorbed by phosphor particles within the fluorescent screens. This stimulates light emission that is more readily absorbed by the silver halide emulsion layers of the radiographic element.

The need to increase the diagnostic capabilities of radiographic imaging assemblies (film and screen) while minimizing patient exposure to X-radiation has presented a significant, long-standing challenge in the construction of both radiographic films and intensifying screens. In constructing radiographic intensifying screens, the desire is to achieve the maximum longer wavelength electromagnetic radiation emission possible for a given level of X-radiation exposure (that is realized as maximum imaging speed) while obtaining the highest achievable level of image definition (that is, sharpness or resolution). Since maximum speed and maximum sharpness in the screens are not compatible features, most commercial screens represent the best attainable compromise for their intended use.

Examples of radiographic element constructions for medical diagnostic purposes are provided by U.S. Pat. No. 4,425,425 (Abbott et al.) and U.S. Pat. No. 4,425,426 (Abbott et al.), U.S. Pat. No. 4,414,310 (Dickerson), U.S. Pat. No. 4,803,150 (Dickerson et al.), U.S. Pat. No. 4,900,652 (Dickerson et al.), U.S. Pat. No. 5,252,442 (Tsaur et al.), and *Research Disclosure*, Vol. 184, August 1979, Item 18431.

Conventional supports for intensifying screens include plastic films such as cellulose ester, polyester, polyolefin, and polystyrene films that can be loaded with absorbing or reflective dyes or pigments as desired.

The choice of a support for the intensifying screens (upon which the phosphor layer is disposed) illustrates the mutually exclusive choices that are considered in screen optimization. It is generally recognized that supports have a high level of absorption of emitted longer wavelength electromagnetic radiation produce the sharpest radiographic images. The screens that produce the sharpest images are commonly constructed with black supports or polymeric supports loaded with carbon black. In these constructions, sharpness is improved at the expense of photographic speed because a portion of the otherwise available, emitted longer wavelength radiation is not directed to the adjacent radiographic film.

However, even the best reflective supports known in the art have degraded image sharpness in relation to imaging speed so as to restrict their use to situations wherein image sharpness is less demanding. Further, many types of reflective supports that have been found suitable for other purposes have been tried and rejected for use in screens. For example, the loading of the supports with optical brighteners, widely used as "whiteners", such as barium sulfate and titanium dioxide has been found incompatible with achieving satisfactory image sharpness with screens.

There exists in the art a class of reflective supports (known as "stretch cavitation microvoided" supports) that are composed of stretched polymeric films having small voids that may contain various particles such as polymeric microbeads. By biaxially stretching the support, stretch cavitation microvoids are introduced into the polymeric films, rendering the films opaque.

Such stretch cavitation microvoided supports have been used in photographic elements, bottles, tubes, fibers, and rods among other articles.

U.S. Pat. No. 4,912,333 (Roberts et al.) describes the use of stretch cavitation microvoided supports composed of a continuous polymeric phase, immiscible microbeads dispersed therein, and reflective microvoids (also called "lenslets") for fluorescent intensifying screens. The microbeads are composed of polymeric materials with specific refractive indices. Cellulose acetate microbeads are particularly useful.

Copending and commonly assigned U.S. Ser. No. 10/706,524 (filed Nov. 12, 2003 by Laney and Steklenski) relates to phosphor screens having highly reflective microvoided polyester supports.

Problem to be Solved

While various support materials known in the art have been used in commercial products, there remains a need for additional fluorescent intensifying screens that have increased reflectance over the typical radiation range, but particularly in the "near UV" region (typically from about 350 to about 400 mm) of the electromagnetic spectrum. There is a need for such screens that provide increased photographic speed without a significant loss in image sharpness.

SUMMARY OF THE INVENTION

The present invention provides a phosphor screen that comprises an inorganic phosphor capable of absorbing X-rays and emitting electromagnetic radiation having a wavelength greater than 300 nm, the inorganic phosphor being coated in admixture with a polymeric binder in a phosphor layer onto a flexible support, the flexible support comprising a reflective substrate comprising a at least one layer comprising a continuous poly(lactic acid) first phase and a second phase dispersed within the continuous poly(lactic acid) first phase, the second phase comprised of microvoids containing barium sulfate particles.

More generically, this invention also provides a flexible film comprising at least one layer comprising a continuous poly(lactic acid) first phase and a second phase dispersed within the continuous poly(lactic acid) first phase, the second phase comprised of microvoids containing inorganic particles.

In addition, this invention provides a radiographic imaging assembly comprising:

a) a photosensitive silver halide-containing film comprising a support having first and second major surfaces, the photosensitive silver halide-containing film having disposed on at least the first major support surface, one or more photosensitive emulsion layers, and b) a phosphor screen that comprises an inorganic phosphor capable of absorbing X-rays and emitting electromagnetic radiation having a wavelength greater than 300 nm, the inorganic phosphor being coated in admixture with a polymeric binder in a phosphor layer onto a flexible support, the flexible support comprising a reflective substrate comprising at least one layer comprising a continuous poly(lactic acid) first phase and a second phase dispersed within the continuous poly(lactic acid) first phase, the second phase comprised of microvoids containing barium sulfate particles.

Further, a method of providing a radiographic image comprises:

A) directing imaging X-radiation through a phosphor screen that comprises an inorganic phosphor capable of absorbing X-rays and emitting electromagnetic radiation having a wavelength greater than 300 nm, the inorganic phosphor being coated in admixture with a polymeric binder in a phosphor layer onto a flexible support, the flexible support comprising a reflective substrate comprising at least one layer comprising a continuous poly(lactic acid) first phase and a second phase dispersed within the continuous poly(lactic acid) first phase, the second phase comprised of microvoids containing barium sulfate particles, thereby causing the electromagnetic radiation to impinge on a photosensitive silver halide-containing film comprising a support having first and second major surfaces, the photosensitive silver halide-containing film having disposed on at least the first major support surface, one or more photosensitive emulsion layers, to form a latent image in the film, and B) developing the latent image in the film.

The screen of the present invention has a support that has increased reflectivity, especially in the region of from about 350 to about 450 nm. This support includes one or more layers, at least one layer containing specific particles, that is barium sulfate, in the microvoids of a continuous poly(lactic acid) phase.

The improvement in reflectivity of a phosphor screen of the present invention over phosphor screens of the prior art is illustrated in FIG. 6 wherein Curve A represents the reflectance spectrum for a conventional non-microvoided poly(ethylene terephthalate) support used in many conventional screens including Kodak Lanex® Regular Screen (Eastman Kodak Company). In addition, Curve B represents the reflectance spectrum for a non-microvoided Melinex™ 339 polyester film (available from DuPont-Teijin Films), and Curve C represents the reflectance spectrum for a microvoided poly(ethylene terephthalate) support that contains no reflective inorganic particulate materials. Lastly, Curve D represents the reflectance spectrum for a reflective support of the present invention containing poly(lactic acid). The combination of reflective lenslets (microvoids) formed around the barium sulfate particles and the highly reflective barium sulfate particles, particularly in the near UV range demonstrates the present invention (Curve D).

DETAILED DESCRIPTION OF THE INVENTION

Figure 1:
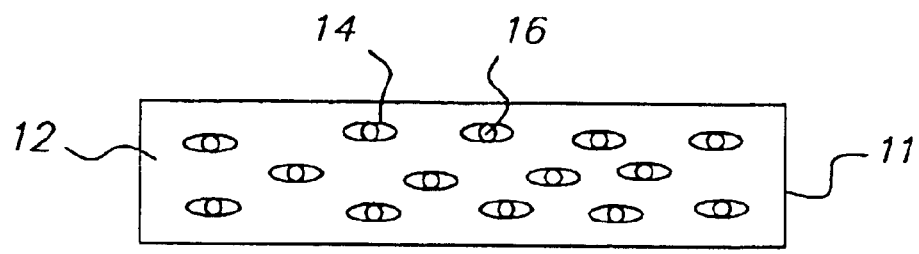
FIG. 1 is an enlarged cross-sectional view of a support comprising a single reflective substrate.

Definitions:

The term "dual-coated" is used to define a radiographic material having one or imaging layers disposed on both the front- and backsides of the support. A "single-coated" radiographic material has one or more imaging layers on one side of the support only. The radiographic materials used in the present invention can be "single-coated" or "dual-coated."

The term "fluorescent intensifying screen" refers to a "prompt-emitting" phosphor screen that absorbs X-radiation and immediately emits light upon exposure.

The term "storage fluorescent screens" refer to phosphor screens that can "store" the exposing X-radiation for emission at a later time when the screen is irradiated with other radiation (usually visible light).

The "phosphor screens" of the present invention can be either "fluorescent intensifying screens" or "storage fluorescent screens", but preferably they are "fluorescent intensifying screens".

The terms "front" and "back" refer to layers, films, or phosphor screens nearer to and farther from, respectively, a source of X-radiation.

The term "rare earth" is used to indicate chemical elements having an atomic number of 39 or 57 through 71.

"Poly(lactic acid)" refers to poly(lactic acid)-based polymers or polylactide-based polymers of all isomers that are generally referred to in the art as "PLA". Therefore, the terms "poly(lactic acid)", "polylactide", and "PLA" are used interchangeably in this application to include homopolymers or copolymers of lactic acid or lactide based on polymer characterization of the polymers being formed from a specific monomer or the polymers being comprised of the smallest repeating monomer units. These terms, however, are not meant to be limiting with respect to the manner in which the polymer is formed. The PLA used in this invention includes single D- or L-isomers, or mixtures thereof. Thus, the PLA includes poly(D-lactic acid), poly(L-lactic acid), and mixtures thereof.

*Research Disclosure* is published by Kenneth Mason Publications, Ltd., Dudley House, 12 North St., Emsworth, Hampshire PO10 7DQ England. This publication is also available from Emsworth Design Inc., 147 West 24th Street, New York, N.Y. 10011.

Phosphor Screens:

The phosphors screens of this invention are typically designed to absorb X-radiation and to emit electromagnetic radiation having a wavelength greater than 300 nm. These screens can take any convenient form providing they meet all of the usual requirements for use in radiographic imaging. Examples of conventional, useful fluorescent intensifying screens and methods of making them are provided by Research Disclosure, Item 18431, cited above, Section IX. X-Ray Screens/Phosphors, and U.S. Pat. No. 5,021,327 (Bunch et al.), U.S. Pat. No. 4,994,355 (Dickerson et al.), U.S. Pat. No. 4,997,750 (Dickerson et al.), and U.S. Pat. No. 5,108,881 (Dickerson et al.), the disclosures of which are incorporated herein by reference. The fluorescent or phosphor layer contains phosphor particles and a binder, optimally additionally containing a light scattering material, such as titania or light absorbing materials such as particulate carbon, dyes or pigments. Any conventional binder (or mixture thereof) can be used but preferably the binder is an aliphatic polyurethane elastomer or another highly transparent elastomeric polymer.

Any conventional or useful prompt-emitting or storage phosphor can be used, singly or in mixtures, in the phosphor screens used in the practice of this invention. For example, useful phosphors are described in numerous references relating to fluorescent intensifying and storage screens, including but not limited to, Research Disclosure, Vol. 184, August 1979, Item 18431, Section IX, X-ray Screens/ Phosphors, and U.S. Pat. No. 2,303,942 (Wynd et al.), U.S. Pat. No. 3,778,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428,247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355 (Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366. Nakajima et al.), U.S. Pat. No. 5,401,971 (Roberts et al.), U.S. Pat. No. 5,871,892 (Dickerson et al.), EP 0 491,116A1 (Benzo et al.), the disclosures of all of which are incorporated herein by reference with respect to the phosphors.

Useful phosphors include, but are not limited to, calcium tungstate ($CaWO_4$), activated or unactivated lithium stannates, niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Some preferred rare earth oxychalcogenide and oxyhalide phosphors are represented by the following formula (1):

$$M'_{(w-n)}M''_{n}O_{w}X' \tag{1}$$

wherein M' is at least one of the metals yttrium (Y), lanthanum (La), gadolinium (Gd), or lutetium (Lu), M" is at least one of the rare earth metals, preferably dysprosium (Dy), erbium (Er), europium (Eu), holmium (Ho), neodymium (Nd), praseodymium (Pr), samarium (Sm), tantalum (Ta), terbium (Tb), thulium (Tm), or ytterbium (Yb), X' is a middle chalcogen (S, Se, or Te) or halogen, n is 0.002 to 0.2, and w is 1 when X' is halogen or 2 when X' is a middle chalcogen. These include rare earth-activated lanthanum oxybromides, and terbium-activated or thulium-activated gadolinium oxides such as $Gd_2O_2S:Tb$.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors.

Another class of useful phosphors includes rare earth hosts such as rare earth activated mixed alkaline earth metal sulfates such as europium-activated barium strontium sulfate.

Further useful phosphors are those containing doped or undoped tantalum such as $YTaO_4$, $YTaO_4:Nb$, $Y(Sr)TaO_4$, and $Y(Sr)TaO_4:Nb$. These phosphors are described in U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), all incorporated herein by reference.

The fluorescent intensifying screens of this invention preferably have as a phosphor, a gadolinium oxysulfide:terbium (that is, terbium activated gadolinium oxysulfide) phosphor or a europium-doped barium fluorobromide phosphor. The coverage of phosphor in the dried layer is generally from about 250 to about 450 $g/m^2$, and preferably from about 300 to about 400 $\mu m^2$.

An optional but preferred component of the phosphor screens of this invention is a protective overcoat layer disposed over the phosphor layer. This protective overcoat layer can comprise one or more polymer binders normally used for this purpose, such as a cellulose ester (for example cellulose acetate).

In some embodiments, the protective layer includes a miscible blend of "first" and "second" polymers. This miscible blend can include two or more of each type of polymer. The first polymer is a poly(vinylidene fluoride-co-tetrafluoroethylene) wherein the recurring units derived from the vinylidene fluoride monomer can compose from about 20 to about 80 mol % (preferably from about 40 to about 60 mol %) of the total recurring units in the polymer, and the remainder of the recurring units are derived from tetrafluoroethylene. These polymers are sometimes identified in the literature as "$PVF_2$" and can be prepared using known monomeric reactants and polymerization conditions. Alternatively, they can be commercially obtained from a number of sources. For example, $PVF_2$ is available as Kynar 7201 from Atofina Chemicals, Inc. (Philadelphia, Pa.).

The second polymer is a poly(alkyl acrylate or methacrylate). Examples of such polymers include, but are not limited to, poly(methyl acrylate), poly(methyl methacrylate), poly(ethyl acrylate), poly(ethyl methacrylate), and poly(chloromethyl methacrylate). The poly(1- or 2-carbon alkyl acrylates or methacrylates) including, but not limited to, poly(methyl methacrylate) and poly(ethyl methacrylate) are preferred. These polymers are readily prepared using known monomeric reactants and polymerization conditions, and can also be obtained from several commercial sources. For example, poly(methyl methacrylate) or "PMMA" can be obtained as Elvacite 2051 from ICI Acrylics (Memphis, Tenn.).

The protective overcoat layer can also include various matte particles, lubricants, micronized waxes, and surfactants, if desired. Useful matte particles include both inorganic and organic particles that generally have a particle size of from about 4 to about 20 $\mu m$. Examples of suitable matte particles include, but are not limited to, talc, silica particles or other inorganic particulate materials, and various organic polymeric particles that are known for this purpose in the art. The amount of matte particles present in the protective overcoat layer can be up to 10% (based on total layer dry weight). The protective overcoat layer may also include one or more lubricants in an amount of up to 10% (based on total dry layer weight).

The protective overcoat layer generally has a dry thickness of from about 3 to about 15 µm, and a preferred dry thickness of from about 5 to about 13 µm.

The support of the phosphor screens of the present invention is a flexible single- or multi-layer reflective sheet. At least one of the layers of this sheet is a reflective substrate that comprises a continuous poly(lactic acid) first phase and a second phase dispersed within the continuous poly(lactic acid) first phase. This second phase comprises microvoids containing barium sulfate or other inorganic particles. Each of these features is described below.

In one embodiment, the support used for the phosphor screens is a single layer reflective substrate with the noted components and characteristics. This particular embodiment is shown in FIG. 1 wherein the support is composed of reflective substrate 11 that comprises continuous poly(lactic acid) phase 12 and microvoids 14 containing barium sulfate particles 16 dispersed therein.

Figure 2:
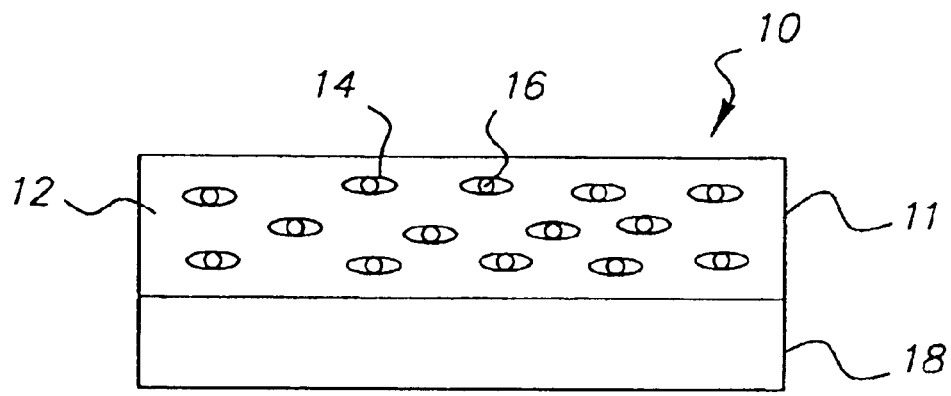
FIGS. 2–4 are enlarged cross-sectional views of various supports comprising a reflective substrate and an additional layer.

In other and more preferred embodiments, the support comprises at least one other polymer layer that is arranged adjacent the reflective support. This additional polymer layer(s) can be co-extruded with the reflective substrate or adhered to it in a suitable manner. Any suitable film-forming polymer (or mixture thereof) can be used in the additional polymer layer(s). One embodiment of this type is shown in FIG. 2 wherein support 10 comprises reflective substrate 11 and adjacent layer 18.

Figure 3:
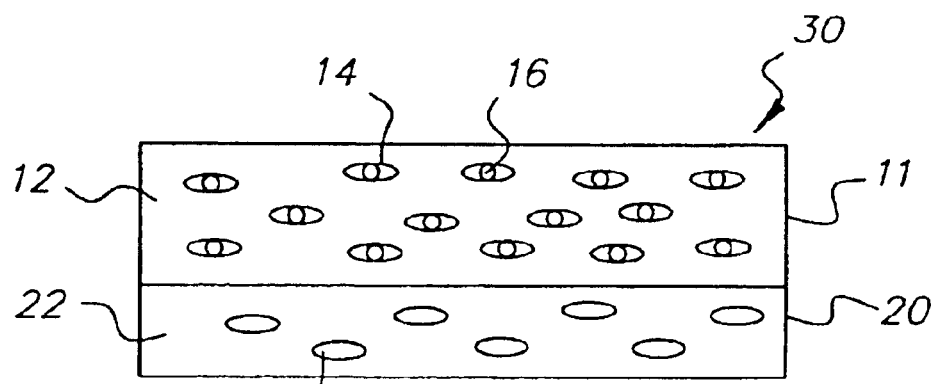

Still another embodiment is shown in FIG. 3 wherein support 30 comprises reflective substrate 11 and adjacent layer 20 that includes continuous poly(lactic acid) phase 22 and microvoids 24 dispersed therein (but no barium sulfate particles in microvoids 24).

Figure 4:
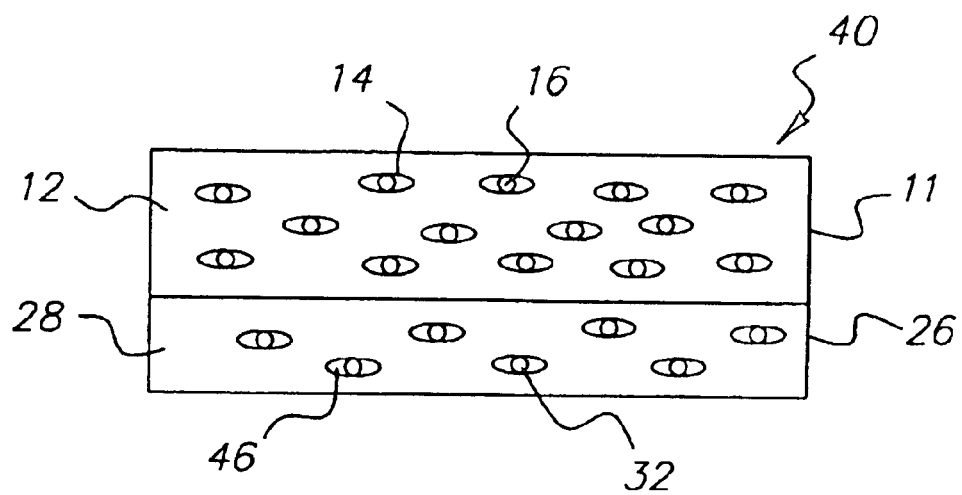

An alternative to the previous embodiment is shown in FIG. 4 wherein support 40 comprises reflective substrate 11 and adjacent layer 26 that includes continuous polymer phase 28 and microvoids 46 containing particles 32 other than barium sulfate dispersed therein. The polymer in adjacent layer 26 can be any suitable material that provides a continuous film, including a polyester or poly(lactic acid).

Figure 5:
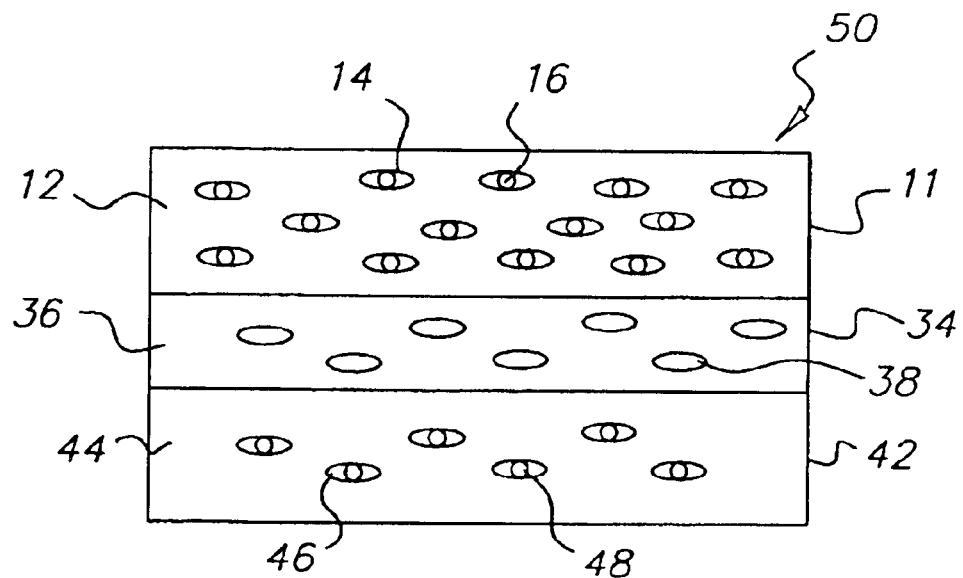
FIG. 5 is an enlarged cross-sectional view of a support comprising two reflective substrates on either side of an additional microvoided polymer layer.
Figure 6:
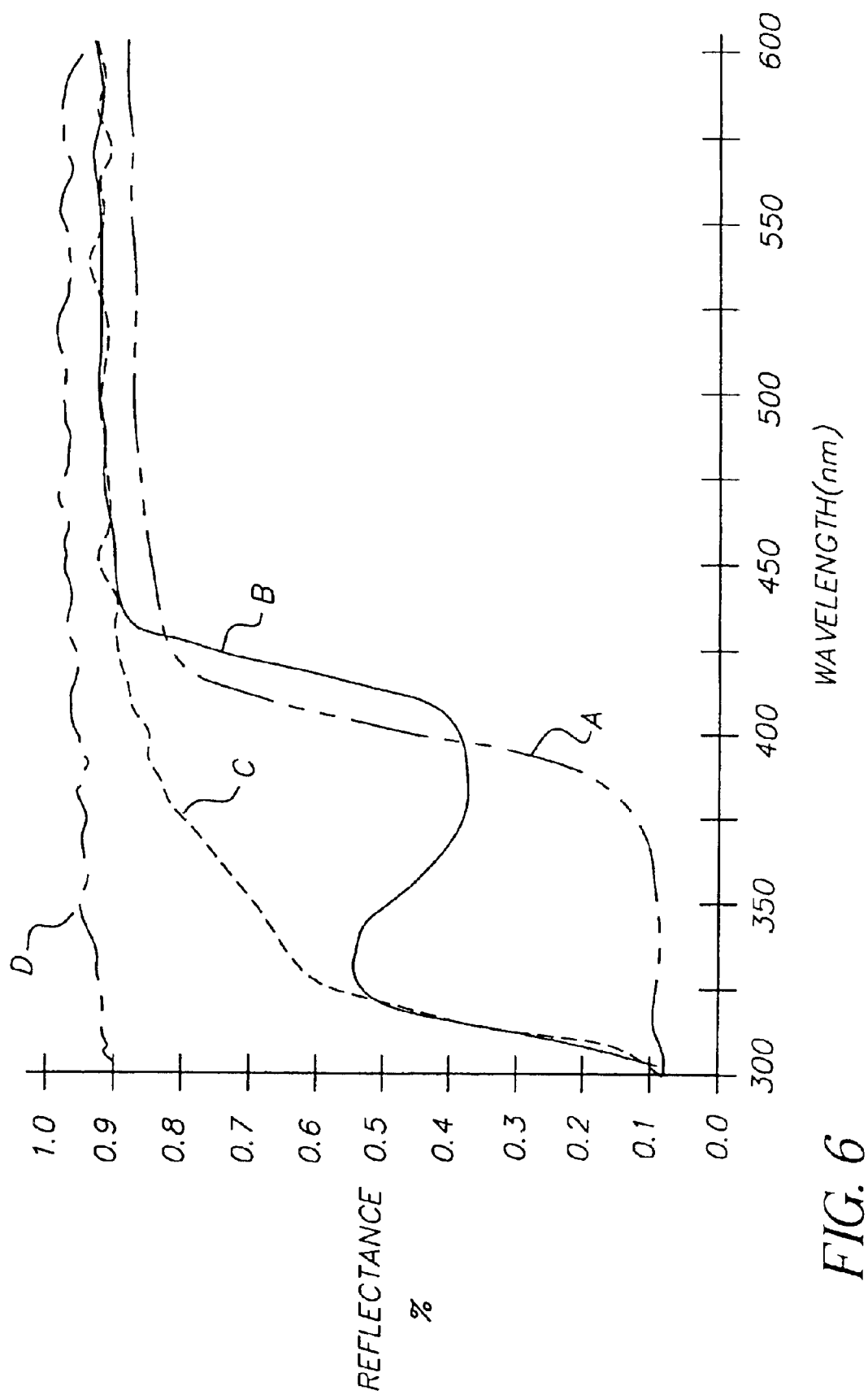
FIG. 6 is a graphical representation of % reflectance vs. wavelength for various supports used in phosphor screens.

A preferred embodiment is illustrated in FIG. 5 wherein support 50 comprises a first reflective substrate 11, an adjacent layer 34 that includes continuous poly(lactic acid) phase 36 and microvoids 38 that may or may not include particles (but definitely not barium sulfate particles), and a second reflective substrate 42 that includes continuous polymer phase 44 and microvoids 46 containing barium sulfate particles 48. Thus, two reflective substrates as defined herein are used to "sandwich" a microvoided poly(lactic acid) layer that may or may not include particles in the microvoids. If particles are present in this layer, however, they are not barium sulfate particles. The two reflective substrates can be the same or different in polymer composition, volume and size of microvoids, and size and amount of barium sulfate as long as one reflective substrate includes poly(lactic acid) as the continuous phase. Further details of microvoided poly(lactic acid) layers are provided below.

The support described herein is capable of reflecting at least 90% (preferably at least 94%) of incident radiation having a wavelength of from about 300 to about 700 nm. This property is achieved by the judicious selection of the poly(lactic acid) first phase, microvoids and proportion thereof, amount of barium sulfate, and the use of multiple layers having microvoids and/or barium sulfate particles.

The continuous poly(lactic acid) first phase of the reflective substrate provides a matrix for the other components of the reflective substrate and is transparent to longer wavelength electromagnetic radiation. This poly(lactic acid) phase can comprise a film or sheet of one or more thermoplastic poly(lactic acid)s (individual isomers or mixtures of isomers), which film has been biaxially stretched (that is, stretched in both the longitudinal and transverse directions) to create the microvoids therein around the barium sulfate particles. Any suitable poly(lactic acid) or polylactide can be used as long as it can be cast, spun, molded, or otherwise formed into a film or sheet, and can be biaxially oriented as noted above. Generally, the poly(lactic acid)s have a glass transition temperature of from about 55 to about 65° C. (preferably from about 58 to about 64° C.) as determined using a differential scanning calorimeter (DSC).

Suitable poly(lactic acid)s can be prepared by polymerization or lactic acid or lactide and comprise at least 50% by weight of lactic acid residue repeating units, lactide residue repeating units, or combinations thereof. These lactic acid and lactide polymers include homopolymers and copolymers such as random and/or block copolymers of lactic acid and/or lactide. The lactic acid residue repeating monomer units may be obtained from L-lactic acid, D-lactic acid, or D,L-lactic acid, preferably with L-lactic acid isomer levels up to 99% to provide poly(L-lactic acid). Examples of commercially available poly(lactic acid) polymers include a variety of poly(lactic acid)s that are available from Chronopol Inc. (Golden, Colo.), or polylactides sold under the trade name EcoPLA®. Further examples of suitable commercially available poly(lactic acid) are Natureworks® from Cargill Dow, Lacea® from Mitsui Chemical, or L5000 from Biomer. When using poly(lactic acid), it may be desirable to have the poly(lactic acid) in the semi-crystalline form.

Additional chemical details about lactic acid and polymers prepared therefrom are provided in a publication by Auras et al., Poly(lactide): a Natural "Green" Alternative for Plastic Packaging Materials, School of Packaging, Michigan State University (E. Lansing, Mich. USA 48824-1223).

Poly(lactic acid)s may be synthesized by conventionally known methods. They may be synthesized by a direct dehydration condensation or lactic acid, or ring-opening polymerization of a cyclic dimmer (lactide) of lactic acid in the presence of a catalyst. However, poly(lactic acid) preparation is not limited to these processes. Copolymerization may also be carried out in the above processes by addition of a small amount of glycerol and other polyhydric alcohols, butanetetracarboxylic acid and other aliphatic polybasic acids, or polysaccharide and other polyhydric alcohols. Further, molecular weight of poly(lactic acid) may be increased by addition of a chain extender such as diisocyanate.

The ratio of the reflective index of the continuous poly(lactic acid) first phase to the second phase is from about 1.4:1 to about 1.6:1.

Barium sulfate particles are incorporated into the continuous poly(lactic acid) phase as described below. These particles generally have an average particle size of from about 0.6 to about 2 µm (preferably from about 0.7 to about 1.0 µm). In addition, these particles comprise from about 23 to about 65 weight % (preferably from about 50 to about 60 weight %) of the total dry reflective substrate weight, and from about 15 to about 25% of the total reflective substrate volume.

The barium sulfate particles can be incorporated into the continuous poly(lactic acid) phase by various means. For example, they can be incorporated during polymerization of the lactic acid or lactide used to make the continuous first phase. Alternatively and preferably, they are incorporated by mixing them into pellets of poly(lactic acid) and extruding the mixture to produce a melt stream that is cooled into the desired sheet containing barium sulfate particles dispersed within the microvoids.

These barium sulfate particles are at least partially bordered by voids because they are embedded in the microvoids distributed throughout the continuous poly(lactic acid) first phase. Thus, the microvoids containing the barium sulfate particles comprise a second phase dispersed within the continuous poly(lactic acid) first phase. The microvoids generally occupy from about 35 to about 60% (by volume) of the dry reflective substrate.

The microvoids can be of any particular shape, that is circular, elliptical, convex, or any other shape reflecting the film orientation process and the shape and size of the barium sulfate particles. The size and ultimate physical properties of the microvoids depend upon the degree and balance of the orientation, temperature and rate of stretching, crystallization characteristics of the poly(lactic acid), the size and distribution of the barium sulfate particles, and other considerations that would be apparent to one skilled in the art. Generally, the microvoids are formed when the extruded sheet containing barium sulfate particles is biaxially stretched using conventional orientation techniques.

Thus, in general, the reflective substrates used in the practice of this invention are prepared by:

(a) blending barium sulfate particles into a desired poly (lactic acid) as the continuous phase, (b) forming a sheet of the poly(lactic acid) containing barium sulfate particles, such as by extrusion, and (c) stretching the sheet in one or transverse directions to form microvoids around the barium sulfate particles.

The present invention does not require but permits the use or addition of various organic and inorganic materials such as pigments, anti-block agents, antistatic agents, plasticizers, dyes, stabilizers, nucleating agents, and other addenda known in the art to the reflective substrate. These materials may be incorporated into the poly(lactic acid) phase or they may exist as separate dispersed phases and can be incorporated into the poly(lactic acid) using known techniques.

The reflective substrate can have a thickness (dry) of from about 75 to about 400 $\mu$m (preferably from about 150 to about 225 $\mu$m). If there are multiple reflective substrates in the support, their thickness can be the same or different.

As noted above, the reflective substrate can be the sole layer of the support for the phosphor screen, but in some preferred embodiments, additional layers are formed or laminated with one or more reflective substrate to form a multi-layer or multi-strata support. In preferred embodiments, the support further comprises an addition polymer layer such as a stretched microvoided polyester layer. This additional polymer layer is arranged directly adjacent the reflective substrate, but opposite the phosphor layer. In other words, the reflective layer is closer to the phosphor layer than the microvoided poly(lactic acid) layer. FIGS. 2–4 noted above illustrate some of these embodiments.

In such embodiments, the microvoided poly(lactic acid) layers can comprise microvoids in an amount of from about 35 to about 60% (by total layer volume). The additional layers (with or without microvoids) can have a dry thickness of from about 30 to about 120 $\mu$m (preferably from about 50 to about 70 $\mu$m). The polymer(s) in the additional layer can be same or different as those in the reflective substrate.

These additional microvoided polymer layers can also include organic or inorganic particles in the microvoids as long as those particles are not barium sulfate. Useful particles includes polymeric beads (such as cellulose acetate particles), crosslinked polymeric microbeads, immiscible polymer particles (such as polypropylene particles), and other particulate materials known in the art that will not interfere with the desired reflectivity of the support required for the present invention.

Flexible Films:

The present invention provides flexible films for a variety of uses that include at least one layer that has a continuous poly(lactic acid) first phase. Dispersed within that continuous first phase is a second phase comprised of microvoids containing inorganic particles. The poly(lactic acid) and microvoids can be provided and generated as described above. The inorganic particles useful in these flexible films include, but are not limited to barium sulfate, zinc sulfide, titanium dioxide, and calcium carbonate particles. Barium sulfate particles are preferred.

The size and amount of the microvoids and inorganic particles in the flexible film can vary considerably, and the preferred characteristics are the same as those described for the phosphor screen substrate described above.

Radiographic Materials:

The radiographic materials useful in the practice of this invention can be "wet" radiographic films that are normally processed in "wet" processing solutions (developer, fixing, wash) or "dry" photosensitive thermally-developable materials (also known as photothermographic materials) that are processed in a "dry" state using thermal energy. Each type of radiographic material is described in more detail below. Each usually includes a flexible support having disposed on both sides thereof, one or more photosensitive silver halide-containing emulsion layers and optionally one or more non-photosensitive layer(s).

The support of the radiographic materials can take the form of any conventional radiographic film support that is light transmissive. Useful supports for the films of this invention can be chosen from among those described in *Research Disclosure*, September 1996, Item 38957 XV. Supports and *Research Disclosure*, Vol. 184, August 1979, Item 18431, XII. Film Supports and preferably include various polycarbonates and polyesters [such as poly (ethylene terephthalate)]. The support is preferably a transparent film support. In its simplest possible form the transparent film support consists of a transparent film chosen to allow direct adhesion of the imaging or other layers disposed thereon. In most instances, the imaging and other layers are "hydrophilic" in nature and include various hydrophilic binder materials that are well known in the art. More commonly, the transparent film is itself hydrophobic and subbing layers may be coated thereon to facilitate adhesion of the hydrophilic imaging layers. Typically the film support is either colorless or blue tinted (tinting dye being present in one or both of the support film and the subbing layers). Polyethylene terephthalate and polyethylene naphthalate are the preferred transparent film support materials.

In the more preferred embodiments, at least one non-photosensitive layer is included with the one or more imaging layers on each side of the film support. This layer may be called an interlayer or overcoat, or both. It is also preferred that the radiographic materials be dual-coated with one or more imaging layers on each side of the support.

"Wet" Radiographic Materials:

Useful radiographic materials can comprise silver halide grains that have any desirable morphology including, but not limited to, cubic, octahedral, tetradecahedral, rounded, spherical, tabular, or other morphologies, or be comprised of a mixture of two or more such morphologies.

Preferably, the "frontside" of the support comprises one or more silver halide emulsion layers, one of which contains predominantly tabular grains (that is, more than 50 weight % of all grains). The tabular silver halide grains particularly include predominantly (at least 70 mol %) bromide, and preferably at least 90 mol % bromide, based on total silver in the emulsion layer. In addition, these cubic grains can have up to 3 mol % iodide, and/or up to 15 mol % chloride, based on total silver in the emulsion layer. The tabular silver halide grains in each silver halide emulsion unit (or silver halide emulsion layers) can be the same or different, or mixtures of different types of cubic grains.

The emulsions used in the radiographic materials can be doped with any of conventional dopants to increase the contrast. Particularly useful dopants are hexacoordination complexes of Group 8 transition metals such as ruthenium.

The backside of the support also includes one or more silver halide emulsion layers, preferably at least one of which comprises tabular silver halide grains. Generally, at least 50% (and preferably at least 80%) of the silver halide grain projected area in this silver halide emulsion layer is provided by tabular grains having an average aspect ratio greater than 5, and more preferably greater than 10. In addition, the tabular grains are predominantly (at least 90 mol %) bromide based on the total silver in the emulsion layer and can include up to 3 mol % iodide. Preferably, the tabular grains are pure silver bromide.

Tabular grain emulsions that have the desired composition and sizes are described in greater detail in the following patents, the disclosures of which are incorporated herein by reference:

U.S. Pat. No. 4,414,310 (Dickerson), U.S. Pat. No. 4,425,425 (Abbott et al.), U.S. Pat. No. 4,425,426 (Abbott et al.), U.S. Pat. No. 4,439,520 (Kofron et al.), U.S. Pat. No. 4,434,226 (Wilgus et al.), U.S. Pat. No. 4,435,501 (Maskasky), U.S. Pat. No. 4,713,320 (Maskasky), U.S. Pat. No. 4,803,150 (Dickerson et al.), U.S. Pat. No. 4,900,355 (Dickerson et al.), U.S. Pat. No. 4,994,355 (Dickerson et al.), U.S. Pat. No. 4,997,750 (Dickerson et al.), U.S. Pat. No. 5,021,327 (Bunch et al.), U.S. Pat. No. 5,147,771 (Tsaur et al.), U.S. Pat. No. 5,147,772 (Tsaur et al.), U.S. Pat. No. 5,147,773 (Tsaur et al.), U.S. Pat. No. 5,171,659 (Tsaur et al.), U.S. Pat. No. 5,252,442 (Dickerson et al.), U.S. Pat. No. 5,370,977 (Zietlow), U.S. Pat. No. 5,391,469 (Dickerson), U.S. Pat. No. 5,399,470 (Dickerson et al.), U.S. Pat. No. 5,411,853 (Maskasky), U.S. Pat. No. 5,418,125 (Maskasky), U.S. Pat. No. 5,494,789 (Daubendiek et al.), U.S. Pat. No. 5,503,970 (Olm et al.), U.S. Pat. No. 5,536,632 (Wen et al.), U.S. Pat. No. 5,518,872 (King et al.), U.S. Pat. No. 5,567,580 (Fenton et al.), U.S. Pat. No. 5,573,902 (Daubendiek et al.), U.S. Pat. No. 5,576,156 (Dickerson), U.S. Pat. No. 5,576,168 (Daubendiek et al.), U.S. Pat. No. 5,576,171 (Olm et al.), and U.S. Pat. No. 5,582,965 (Deaton et al.).

The backside ("second major support surface") of the radiographic materials can also include an antihalation layer disposed over the silver halide emulsion layer(s). This layer comprises one or more antihalation dyes or pigments dispersed on a suitable hydrophilic binder (described below). In general, such antihalation dyes or pigments are chosen to absorb whatever radiation the film is likely to be exposed to from a fluorescent intensifying screen. One useful class of particulate antihalation dyes includes nonionic polymethine dyes such as merocyanine, oxonol, hemioxonol, styryl, and arylidene dyes as described in U.S. Pat. No. 4,803,150 (noted above) that is incorporated herein for the definitions of those dyes. The magenta merocyanine and oxonol dyes are preferred and the oxonol dyes are most preferred.

A general summary of silver halide emulsions and their preparation are provided by *Research Disclosure*, Item 38957, cited above, Section 1. Emulsion grains and their preparation. After precipitation and before chemical sensitization the emulsions can be washed by any convenient conventional technique using techniques disclosed by *Research Disclosure*, Item 38957, cited above, Section III. Emulsion washing.

The emulsions can be chemically sensitized by any convenient conventional technique. Sulfur sensitization is preferred. A combination of gold and sulfur sensitization is most preferred.

In addition, if desired, the silver halide emulsions can include one or more suitable spectral sensitizing dyes, for example cyanine and merocyanine spectral sensitizing dyes, including the benzimidazolocarbocyanine dyes described in U.S. Pat. No. 5,210,014 (Anderson et al.), incorporated herein by reference. The useful amounts of such dyes are well known in the art but are generally within the range of from about 200 to about 1000 mg/mole of silver in the emulsion layer.

In preferred embodiments, at least one of the silver halide emulsion layers comprises a combination of one or more first spectral sensitizing dyes and one or more second spectral sensitizing dyes that provide a combined J-aggregate absorption within the range of from about 540 to about 560 nm (preferably from about 545 to about 555 nm) when absorbed on the cubic silver halide grains. The one or more first spectral sensitizing dyes are anionic benzimidazole-benzoxazole carbocyanines and the one or more second spectral sensitizing dyes are anionic oxycarbocyanines.

It may also be desirable that one or more silver halide emulsion layers include one or more covering power enhancing compounds adsorbed to surfaces of the silver halide grains. A number of such materials are known in the art, but preferred covering power enhancing compounds contain at least one divalent sulfur atom that can take the form of a —S— or =S moiety, as described in U.S. Pat. No. 5,800,976 (Dickerson et al.).

The silver halide emulsion layers and other hydrophilic layers on both sides of the support of the radiographic materials generally contain conventional polymer vehicles (peptizers and binders) that include both synthetically prepared and naturally occurring colloids or polymers. The most preferred polymer vehicles include gelatin or gelatin derivatives alone or in combination with other vehicles. The hydrophilic colloid peptizers are also useful as binders and hence are commonly present in much higher concentrations than required to perform the peptizing function alone. The preferred gelatin vehicles include alkali-treated gelatin, acid-treated gelatin or gelatin derivatives (such as acetylated gelatin, deionized gelatin, oxidized gelatin and phthalated gelatin). Cationic starch used as a peptizer for tabular grains is described in U.S. Pat. No. 5,620,840 (Maskasky) and U.S. Pat. No. 5,667,955 (Maskasky). Both hydrophobic and hydrophilic synthetic polymeric vehicles can be used also. Such materials include, but are not limited to, polyacrylates (including polymethacrylates), polystyrenes and polyacrylamides (including polymethacrylamides). Dextrans can also be used as part or all of the, binder materials in an emulsion layer. Examples of such materials are described for example in U.S. Pat. No. 5,876,913 (Dickerson et al.), incorporated herein by reference.

The silver halide emulsion layers (and other hydrophilic layers) in the radiographic films are generally fully hardened using one or more conventional hardeners. Thus, the amount of hardener in each silver halide emulsion and other hydrophilic layer is generally at least 2% and preferably at least 2.5%, based on the total dry weight of the polymer vehicle in each layer.

The levels of silver and polymer vehicle in the radiographic materials used in the present invention are not critical. In general, the total amount of silver on each side of each film is at least 10 and no more than 55 mg/dm$^2$ in one or more emulsion layers. In addition, the total amount of polymer vehicle on each side of each film is generally at least 35 and no more than 45 mg/dm$^2$ in one or more hydrophilic layers. The amounts of silver and polymer vehicle on the two sides of the support in the radiographic silver halide film can be the same or different. These amounts refer to dry weights.

The "wet" radiographic materials useful in this invention generally include a surface protective overcoat on each side of the support that typically provides physical protection of the emulsion layers. Each protective overcoat can be sub-divided into two or more individual layers. For example, protective overcoats can be sub-divided into surface over-coats and interlayers (between the overcoat and silver halide emulsion layers). Interlayers that are typically thin hydrophilic colloid layers can be used to provide a separation between the emulsion layers and the surface overcoats. The overcoat on at least one side of the support can also include a blue toning dye.

"Dry" Radiographic Materials:

Silver-containing photothermographic materials that are developed with heat and without liquid development have been known in the art for many years. Such materials are used in a recording process wherein an image is formed by imagewise exposure of the photothermographic material to specific electro-magnetic radiation (for example, visible, ultraviolet, or infrared radiation) and developed by the use of thermal energy. These materials, also known as "dry silver" materials, generally comprise a support having coated thereon: (a) a photo catalyst (that is, a photosensitive compound such as silver halide) that upon such exposure provides a latent image in exposed grains that are capable of acting as a catalyst for the subsequent formation of a silver image in a development step, (b) a non-photosensitive source of reducible silver ions, (c) a reducing composition (usually including a developer) for the reducible silver ions, and (d) a hydrophilic or hydrophobic binder. The latent image is then developed by application of thermal energy.

The photothermographic materials used in this invention can be sensitized to different regions of the spectrum, such as ultraviolet, visible, and infrared radiation. The photosensitive silver halide used in these materials has intrinsic sensitivity to blue light. Increased sensitivity to a particular region of the spectrum is imparted through the use of various sensitizing dyes adsorbed to the silver halide grains.

In the photothermographic materials used in this invention, the components needed for imaging can be in one or more thermally developable layers. The layer(s) that contain the photosensitive silver halide or non-photosensitive source of reducible silver ions, or both, are referred to herein as thermally developable layers or photothermographic emulsion layer(s). The photosensitive silver halide and the non-photosensitive source of reducible silver ions are in catalytic proximity (that is, in reactive association with each other) and preferably are in the same emulsion layer. "Catalytic proximity" or "reactive association" means that they should be in the same layer or in adjacent layers.

Where the materials contain imaging layers on one side of the support only, various non-imaging layers are usually disposed on the "backside" (non-emulsion side) of the materials, including antihalation layer(s), protective layers, antistatic or conductive layers, and transport enabling layers.

In such instances, various layers are also usually disposed on the "frontside" or emulsion side of the support, including protective topcoat layers, barrier layers, primer layers, interlayers, opacifying layers, antistatic or conductive layers, antihalation layers, acutance layers, auxiliary layers, and others readily apparent to one skilled in the art.

"Catalytic proximity" or "reactive association" means that the materials are in the same layer or in adjacent layers so that they readily come into contact with each other during thermal imaging and development.

"Emulsion layer", "imaging layer", "thermally developable imaging layer", or "photothermographic emulsion layer" means a layer of a photothermographic material that contains the photosensitive silver halide and/or non-photosensitive source of reducible silver ions. It can also mean a layer of the photothermographic material that contains, in addition to the photosensitive silver halide and/or non-photosensitive source of reducible ions; additional essential components and/or desirable additives (such as the toner). These layers are usually on what is known as the "frontside" of the support, but in some embodiments, they are present on both sides of the support (such embodiments are known as "double-sided" photothermographic materials). In such double-sided materials the layers can be of the same or different chemical composition, thickness, or sensitometric properties.

As noted above, the photothermographic materials used in the present invention include one or more photocatalysts in the photothermographic emulsion layer(s). Useful photocatalysts are typically silver halides such as silver bromide, silver iodide, silver chloride, silver bromoiodide, silver chlorobromo-iodide, silver chlorobromide, and others readily apparent to one skilled in the art. Mixtures of silver halides can also be used in any suitable proportion. In preferred embodiments, the silver halide comprises at least 70 mol % silver bromide with the remainder being silver chloride and silver iodide. More preferably, the amount of silver bromide is at least 90 molt %. Silver bromide and silver bromoiodide are more preferred silver halides, with the latter silver halide having up to 10 mol % silver iodide based on total silver halide. Typical techniques for preparing and precipitating silver halide grains are described in *Research Disclosure*. 1978, Item 17643.

The shape of the photosensitive silver halide grains used in the present invention is in no way limited. Silver halide grains having cubic and tabular morphology are preferred.

The silver halide grains may have a uniform ratio of halide throughout. They may have a graded halide content, with a continuously varying ratio of, for example, silver bromide and silver iodide or they may be of the core-shell type, having a discrete core of one halide ratio, and a discrete shell of another halide ratio. For example, the central regions of the tabular grains may contain at least 1 mol % more iodide than the outer or annular regions of the grains. Core-shell silver halide grains useful in photothermographic materials and methods of preparing these materials are described for example in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference. Mixtures of preformed silver halide grains having different compositions or dopants grains may be employed.

The photosensitive silver halide can be added to or formed within the emulsion layer(s) in any fashion as long as it is placed in catalytic proximity to the non-photosensitive source of reducible silver ions. The use of preformed silver halide grains is most preferred.

In general, the silver halide grains used in the imaging formulations can vary in average diameter of up to several micrometers ($\mu$m) depending on their desired use. Usually, the silver halide grains have an average particle size of from about 0.01 to about 1.5 $\mu$m. In some embodiments, the average particle size is preferable from about 0.03 to about 1.0 $\mu$m and more preferably from about 0.05 to about 0.8 $\mu$m.

Grain size may be determined by any of the methods commonly employed in the art for particle size measurement. Representative methods are described by in "Particle Size Analysis," ASTM Symposium on Light Microscopy, R. P. Loveland, 1955, pp. 94–122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

In most preferred embodiments of this invention, the silver halide grains useful in this invention are tabular silver halide grains that are considered "ultrathin" and have an average thickness of at least 0.02 $\mu$m and up to and including 0.101. Preferably, these ultrathin grains have an average thickness of at least 0.03 $\mu$m and more preferably of at least 0.035 $\mu$m, and up to and including 0.08 $\mu$m and more preferably up to and including 0.07 $\mu$m.

In addition, these ultrathin tabular grains have an ECD of at least 0.5 $\mu$m, preferably at least 0.75 $\mu$m, and more preferably at least 1 $\mu$m. The ECD can be up to and including 8 $\mu$m, preferably up to and including 6 $\mu$m, and more preferably up to and including 5 $\mu$m.

The aspect ratio of the useful tabular grains is at least 5:1, preferably at least 10:1, and more preferably at least 15:1. For practical purposes, the tabular grain aspect is generally up to 50:1.

Ultrathin tabular grain size may be determined by any of the methods commonly employed in the art for particle size measurement. Representative methods are described, for example, in "Particle Size Analysis," ASTM Symposium on Light Microscopy, R. P. Loveland, 1955, pp. 94–122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

The ultrathin tabular silver halide grains can also be doped using one or more of the conventional metal dopants known for this purpose including those described in *Research Disclosure* Item 38957, September, 1996 and U.S. Pat. No. 5,503,970 (Olm et al.), incorporated herein by reference. Preferred dopants include iridium (III or IV) and ruthenium (II or III) salts.

The one or more light-sensitive silver halides used in the photothermographic materials of the present invention are preferably present in an amount of from about 0.005 to about 0.5 mole, more preferably from about 0.01 to about 0.25 mole, and most preferably from about 0.03 to about 0.15 mole, per mole of non-photosensitive source of reducible silver ions.

The photosensitive silver halide used in the present invention may be employed without modification. However, it may be chemically sensitized with one or more chemical sensitizing agents such as compounds containing sulfur, selenium, or tellurium, a compound containing gold, platinum, palladium, iron, ruthenium, rhodium, or iridium, a reducing agent such as a tin halide.

Some specific examples of useful selenium compounds can be found in U.S. Pat. Nos. 5,158,892 (Sasaki et al.), 5,238,807 (Sasaki et al.), and 5,942,384 (Arai et al.).

Examples of useful tellurium chemical sensitizers include the compounds described in U.S. Pat. No. 1,623,499 (Sheppard et al.), U.S. Pat. No. 3,320,069 (Illingsworth), U.S. Pat. No. 3,772,031 (Berry et al.), U.S. Pat. No. 5,215,880 (Kojima et al.), U.S. Pat. No. 5,273,874 (Kojima et al.), U.S. Pat. No. 5,342,750 (Sasaki et al.), British Patent 235,211 (Sheppard), British Patent 1,121,496 (Halwig), British Patent 1,295,462 (Hilson et al.) and British Patent 1,396,696 (Simons), and JP-04-271341 A (Morio et al.).

The amount of the selenium or tellurium sensitizer used in the present invention varies depending on silver halide grains used or chemical ripening conditions. However, it is generally from $10^{-8}$ to $10^{-2}$ mole per mole of silver halide, preferably on the order of from $10^{-7}$ to $10^{-3}$ mole. The conditions for chemical sensitization in the present invention are not particularly restricted. However, in general, pH is from 5 to 8, pAg is from 6 to 11, preferably from 7 to 10, and temperature is from 40 to 95° C., preferably from 45 to 85° C.

Noble metal sensitizers for use in the present invention include gold, platinum, palladium and iridium. Gold sensitization is particularly preferred.

The gold sensitizer used for the gold sensitization of the silver halide emulsion used in the present invention may have an oxidation number of 1 or 3, and may be a gold compound commonly used as a gold sensitizer.

Useful combinations of gold (I) complexes and rapid sulfiding agents are described in U.S. Pat. No. 6,322,961 (Lam et al.). Combinations of gold (III) compounds and either sulfur or tellurium compounds are useful as chemical sensitizers and are described in U.S. Pat. No. 6,423,481 (Simpson et al.), incorporated herein by reference.

In general, it may also be desirable to add spectral sensitizing dyes to enhance silver halide sensitivity to ultraviolet, visible, and/or infrared radiation. Thus, the photosensitive silver halides may be spectrally sensitized with various dyes that are known to spectrally sensitize silver halide. Non-limiting examples of sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. Cyanine dyes, merocyanine dyes and complex merocyanine dyes are particularly useful.

Suitable sensitizing dyes such as those described in U.S. Pat. No. 3,719,495 (Lea), U.S. Pat. No. 4,396,712 (Kinoshita et al.), U.S. Pat. No. 4,690,883 (Kubodera et al.), U.S. Pat. No. 4,840,882 (Iwagaki et al.), U.S. Pat. No. 5,064,753 (Kohno et al.), U.S. Pat. No. 5,281,515 (Delprato et al.), U.S. Pat. No. 5,393,654 (Burrows et al), U.S. Pat. No. 5,441,866 (Miller et al.), U.S. Pat. No. 5,508,162 (Dankosh), U.S. Pat. No. 5,510,236 (Dankosh), U.S. Pat. No. 5,541,054 (Miller et al.), JP 2000-063690 (Tanaka et al.), JP 2000-112054 (Fukusaka et al.), JP 2000-273329 (Tanaka et al.), JP 2001-005145 (Arai), JP 2001-064527 (Oshiyama et al.), and JP 2001-154305 (Kita et al.), can be used in the practice of the invention. All of the publications noted above are incorporated herein by reference.

An appropriate amount of spectral sensitizing dye added is generally about $10^{-10}$ to $10^{-1}$ mole, and preferably, about $10^{-7}$ to $10^{-2}$ mole per mole of silver halide.

The non-photosensitive source of reducible silver ions used in photothermographic materials can be any organic compound that contains reducible silver (1+) ions. Preferably, it is an organic silver salt that is comparatively stable to light and forms a silver image when heated to 50° C. or higher in the presence of an exposed-photocatalyst (such as silver halide) and a reducing composition. Various silver salts known in the art can be used, alone or in mixtures.

A silver salt of a compound containing an imino group is particularly preferred in the aqueous-based photothermographic formulations used in the practice of this invention. Preferred examples of these compounds include, but are not limited to, silver salts of benzotriazole and substituted derivatives thereof (for example, silver methylbenzotriazole and silver 5-chloro-benzotriazole), silver salts of 1,2,4-triazoles or 1-H-tetrazoles such as phenyl-mercaptotetrazole as described in U.S. Pat. No. 4,220,709 (deMauriac), and silver salts of imidazoles and imidazole derivatives as described in U.S. Pat. No. 4,260,677 (Winslow et al.). Particularly preferred are the silver salts of benzo-triazole and substituted derivatives thereof. A silver salt of benzotriazole is most preferred.

As one skilled in the art would understand, the non-photosensitive source of reducible silver ions can include various mixtures of the various silver salt compounds described herein, in any desirable proportions. However, if mixtures of silver salts are used, it is preferred that at least 50 mol % of the total silver salts be composed of silver salts of compounds containing an imino group as defined above.

The photocatalyst and the non-photosensitive source of reducible silver ions must be in catalytic proximity (that is, reactive association). It is preferred that these reactive components be present in the same emulsion layer.

The one or more non-photosensitive sources of reducible silver ions are preferably present in an amount of about 5% by weight to about 70% by weight, and more preferably, about 10% to about 50% by weight, based on the total dry weight of the emulsion layers. Stated another way, the amount of the sources of reducible silver ions is generally present in an amount of from about 0.001 to about 0.2 mol/m$^2$ of the dry photothermographic material, and preferably from about 0.01 to about 0.05 mol/m$^2$ of that material.

The total amount of silver (from all silver sources) in the photothermographic materials is generally at least 0.002 mol/m$^2$ and preferably from about 0.01 to about 0.05 mol/m$^2$.

The reducing agent (or reducing agent composition comprising two or more components) for the source of reducible silver ions can be any material, preferably an organic material that can reduce silver (I) ion to metallic silver.

Conventional photographic developers can be used as reducing agents, including aromatic di- and tri-hydroxy compounds (such as hydroquinones, gallatic acid and gallic acid derivatives, catechols, and pyrogallols), aminophenols (for example, N-methyl aminophenol), sulfonamidophenols, p-phenylenediamines, alkoxynaphthols (for example, 4-methoxy-1-naphthol), pyrazolidin-3-one type reducing agents (for example PHENIDONE®), pyrazolin-5-ones, polyhydroxy spiro-bis-indanes, indan-1,3-dione derivatives, hydroxytetrone acids, hydroxytetronimides, hydroxylamine derivatives such as for example those described in U.S. Pat. No. 4,082,901 (Laridon et al.), hydrazine derivatives, hindered phenols, amidoximes, azines, reductones, (for example, ascorbic acid and ascorbic acid derivatives), leuco dyes, and other materials readily apparent to one skilled in the art.

When silver benzotriazole is used as the source of reducible silver ions, ascorbic acid reducing agents are preferred. An "ascorbic acid" reducing agent (also referred to as a developer or developing agent) means ascorbic acid, complexes thereof, and derivatives thereof. Ascorbic acid developing agents are described in a considerable number of publications in photographic processes, including U.S. Pat. No. 5,236,816 (Purol et al.) and references cited therein.

Useful ascorbic acid developing agents include ascorbic acid and the analogues, isomers, complexes, and derivatives thereof. Such compounds include, but are not limited to, D- or L-ascorbic acid, 2,3-dihydroxy-2-cyclohexen-1-one, 3,4-dihydroxy-5-phenyl-2(5H)-furanone, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, niacinamide ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in U.S. Pat. No. 5,498,511 (Yamashita et al.), EP-A-0 585,792 (Passarella et al.), EP-A-0 573 700 (Lingier et al.), EP-A-0 588 408 (Hieronymus et al.), U.S. Pat. No. 5,089,819 (Knapp), U.S. Pat. No. 5,278,035 (Knapp), U.S. Pat. No. 5,384,232 (Bishop et al.), U.S. Pat. No. 5,376,510 (Parker et al.), Japanese Kokai 7-56286 (Toyoda), U.S. Pat. No. 2,688,549 (James et al.), and Research Disclosure, publication 37152, March 1995. D-, L-, or D,L-ascorbic acid (and alkali metal salts thereof) or isoascorbic acid (or alkali metal salts thereof) are preferred. Sodium ascorbate and sodium isoascorbate are most preferred. Mixtures of these developing agents can be used if desired.

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Any co-developers may be present generally in an amount of from about 0.001% to about 1.5% (dry weight) of the emulsion layer coating.

The photothermographic materials of the invention can also contain other additives such as shelf-life stabilizers, antifoggants, contrast enhancing agents, development accelerators, acutance dyes, post-processing stabilizers or stabilizer precursors, toners, thermal solvents (also known as melt formers), humectants, and other image-modifying agents as would be readily apparent to one skilled in the art.

Particularly useful toners are mercaptotriazoles defined by the following Structure I:

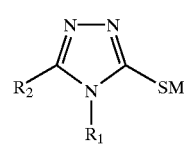

(I)

wherein R$_1$ and R$_1$ independently represent hydrogen, a substituted or unsubstituted alkyl group of from 1 to 7 carbon atoms (such as methyl, ethyl, isopropyl, t-butyl, n-hexyl, hydroxymethyl, and benzyl), a substituted or unsubstituted alkenyl group having 2 to 5 carbon atoms in the hydrocarbon chain (such as ethenyl, 1,2-propenyl, methallyl, and 3-buten-1-yl), a substituted or unsubstituted cycloalkyl group having 5 to 7 carbon atoms forming the ring (such as cyclopenyl, cyclohexyl, and 2,3-dimethylcyclohexyl), a substituted or unsubstituted aromatic or non-aromatic heterocyclyl group having 5 or 6 carbon, nitrogen, oxygen, or sulfur atoms forming the aromatic or non-aromatic heterocyclyl group (such as pyridyl, furanyl, thiazolyl, and thienyl), an amino or amide group (such as amino or acetamido), and a substituted or unsubstituted aryl group having 6 to 10 carbon atoms forming the aromatic ring (such as phenyl, tolyl, naphthyl, and 4-ethoxyphenyl).

In addition, $R_1$ and $R_2$ can be a substituted or unsubstituted $Y_1$—$(CH_2)_k$— group wherein $Y_1$ is a substituted or unsubstituted aryl group having 6 to 10 carbon atoms as defined above for $R_1$ and $R_2$, or a substituted or unsubstituted aromatic or non-aromatic heterocyclyl group as defined above for $R_1$. Also, k is 1–3.

Alternatively, $R_1$ and $R_2$ taken together can form a substituted or unsubstituted, saturated or unsaturated 5- to 7-membered aromatic or non-aromatic nitrogen-containing heterocyclic ring comprising carbon, nitrogen, oxygen, or sulfur atoms in the ring (such as pyridyl, diazinyl, triazinyl, piperidine, morpholine, pyrrolidine, pyrazolidine, and thiomorpholine).

Still again, $R_1$ or $R_2$ can represent a divalent linking group (such as a phenylene, methylene, or ethylene group) linking two mercaptotriazole groups, and $R_2$ may further represent carboxy or its salts.

M is hydrogen or a monovalent cation (such as an alkali metal cation, an ammonium ion, or a pyridinium ion). Preferably, M is hydrogen.

In some preferred toner embodiments, the definition of mercaptotriazoles of Structure I also includes the following provisos:

1) $R_1$ and $R_2$ are not simultaneously hydrogen.
2) When $R_1$ is substituted or unsubstituted phenyl or benzyl, $R_2$ is not substituted or unsubstituted phenyl or benzyl.
3) When $R_2$ is hydrogen, $R_1$ is not an allenyl, 2,2-diphenylethyl, α-methylbenzyl, or a phenyl group having a cyano or a sulfonic acid substituent.
4) When $R_1$ is an unsubstituted benzyl or phenyl group, $R_2$ is not substituted 1,2-dihydroxyethyl, or 2-hydroxy-2-propyl.
5) When $R_1$ is hydrogen, $R_2$ is not 3-phenylthiopropyl.

In addition, the photothermographic material is further defined wherein:

6) One or more thermally developable imaging layers has a pH less than 7.

Preferably, $R_1$ is a methyl, t-butyl, or a substituted or unsubstituted phenyl or benzyl group. More preferably $R_1$ is benzyl. Also, $R_1$ can represent a divalent linking group (such as a 1,4-phenylene, methylene, or ethylene group) that links two mercaptotriazole groups.

Preferably, $R_2$ is hydrogen, acetamido, or hydroxymethyl. More preferably, $R_2$ is hydrogen. Also, $R_2$ can represent a divalent linking group (such as a phenylene, methylene, or ethylene group) that links two mercaptotriazole groups.

It is well known that heterocyclic compounds exist in tautomeric forms. Both annular (ring) tautomerism and substituent tautomerism are possible. In 1,2,4-mercaptotriazoles, at least three tautomers (a 1H form, a 2H form, and a 4H form) are possible.

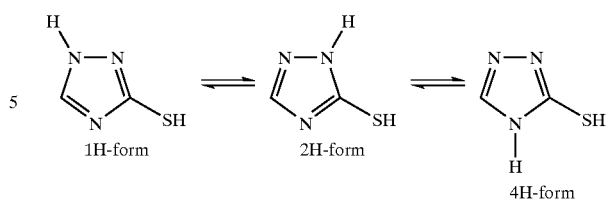

1H-form     2H-form     4H-form

In 1,2,4-mercaptotriazoles, thiol-thione substituent tautomerism is also possible.

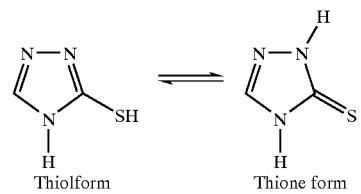

Thiolform     Thione form

Interconversion among these tautomers can occur rapidly and individual tautomers are usually not isolatable, although one tautomeric form may predominate. For the mercaptotriazoles of this invention, the 4H-thiol structural formalism is used with the understanding that such tautomers do exist.

Representative compounds having Structure I and useful as toners in the practice of the present invention are described in U.S. Pat. No. 6,567,410 (noted above), incorporated herein by reference.

Other toners can be used alternatively or included with the one or more mercaptotriazoles described above. Such compounds are well known materials in the photothermographic art, as shown in U.S. Pat. No. 3,080,254 (Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), U.S. Pat. No. 5,599,647 (Defieuw et al.) and GB 1,439,478 (AGFA).

The photocatalyst (such as photosensitive silver halide), the non-photosensitive source of reducible silver ions, the reducing agent composition, toner(s), and any other additives used in the present invention are added to and coated in one or more binders, and particularly hydrophilic binders. Thus, aqueous-based formulations are be used to prepare the photothermographic materials of this invention. Mixtures of different types of hydrophilic binders can also be used.

Examples of useful hydrophilic binders include, but are not limited to, proteins and protein derivatives, gelatin and gelatin derivatives (hardened or unhardened, including alkali- and acid-treated gelatins, and deionized gelatin), cellulosic materials such as hydroxymethyl cellulose and cellulosic esters, acrylamide/methacrylamide polymers, acrylic/methacrylic polymers, polyvinyl pyrrolidones, polyvinyl alcohols, poly(vinyl lactams), polymers of sulfoalkyl acrylate or methacrylates, hydrolyzed polyvinyl acetates, polyamides, polysaccharides (such as dextrans and starch ethers), and other naturally occurring or synthetic vehicles commonly known for use in aqueous-based photographic emulsions.

Particularly useful hydrophilic binders are gelatin, gelatin derivatives, polyvinyl alcohols, and cellulosic materials. Gelatin and its derivatives are most preferred, and comprise at least 75 weight % of total binders when a mixture of binders is used.

Hydrophobic binders can be used, but preferably, they are present as no more than 50% by weight of total binders.

Examples of typical hydrophobic binders include, but are not limited to, polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable binders are polyvinyl butyral resins that are available as BUTVAR® B79 (Solutia, Inc.) and PIOLOFORM® BS-18 or PIOLOFORM® BL-16 (Wacker Chemical Company). Aqueous dispersions (or latexes) of hydrophobic or water-dispersible polymeric latex binders may also be used.

Hardeners for various binders may be present if desired. Useful hardeners are well known and include vinyl sulfone compounds as described in U.S. Pat. No. 6,143,487 (Philip et al.) and aldehydes and various other hardeners as described in U.S. Pat. No. 6,190,822 (Dickerson et al.). The hydrophilic binders used in the photothermographic materials are generally partially or fully hardened using any conventional hardener.

The polymer binder(s) is used in an amount sufficient to carry the components dispersed therein. The effective coverage of binders can be readily determined by one skilled in the art. Preferably, a binder is used at a level of about 10% by weight to about 90% by weight, and more preferably at a level of about 20% by weight to about 70% by weight, based on the total dry weight of the layer in which it is included. The amount of binders in double-sided photothermographic materials may be the same or different.

The photothermographic materials used in this invention comprise a polymeric support that is preferably a flexible, transparent film that has any desired thickness and is composed of one or more polymeric materials, depending upon their use. The supports are generally transparent (especially if the material is used as a photomask) or at least translucent, but in some instances, opaque supports may be useful. They are required to exhibit dimensional stability during thermal development and to have suitable adhesive properties with overlying layers. Useful polymeric materials for making such supports include, but are not limited to, polyesters (such as polyethylene terephthalate and polyethylene naphthalate), cellulose acetate and other cellulose esters, polyvinyl acetal, polyolefins (such as polyethylene and polypropylene), polycarbonates, and polystyrenes (and polymers of styrene derivatives). Preferred supports are composed of polymers having good heat stability, such as polyesters and polycarbonates. Support materials may also be treated or annealed to reduce shrinkage and promote dimensional stability. Polyethylene terephthalate film is a particularly preferred support.

The photothermographic materials can include antistatic or conducting layers. Such layers may contain soluble salts (for example, chlorides or nitrates), evaporated metal layers, or ionic polymers such as those described in U.S. Pat. No. 2,861,056 (Minsk) and U.S. Pat. No. 3,206,312 (Sterman et al.), or insoluble inorganic salts such as those described in U.S. Pat. No. 3,428,451 (Trevoy), electroconductive underlayers such as those described in U.S. Pat. No. 5,310,640 (Markin et al.), electronically-conductive metal antimonate particles such as those described in U.S. Pat. No. 5,368,995 (Christian et al.), and electrically-conductive metal-containing particles dispersed in a polymeric binder such as those described in EP 0 678 776A1 (Melpolder et al.). Other antistatic agents are well known in the art.

Other conductive compositions include one or more fluoro-chemicals each of which is a reaction product of $R_f$—$CH_2CH_2$—$SO_3H$ with an amine wherein $R_f$ comprises 4 or more fully fluorinated carbon atoms.

The photothermographic materials can be constructed of one or more layers on a support. Single layer materials should contain the photocatalyst, the non-photosensitive source of reducible silver ions, the reducing composition, the binder, as well as optional materials such as toners, acutance dyes, coating aids, and other adjuvants.

Two-layer constructions comprising a single imaging layer coating containing all the ingredients and a surface protective topcoat are generally found in the materials of this invention. However, two-layer constructions containing photocatalyst and non-photosensitive source of reducible silver ions in one imaging layer (usually the layer adjacent to the support) and the reducing composition and other ingredients in the second imaging layer or distributed between both layers are also envisioned.

For double-sided photothermographic materials, each side of the support can include one or more of the same or different imaging layers, interlayers, and protective topcoat layers. In such materials preferably a topcoat is present as the outermost layer on both sides of the support. The thermally developable layers on opposite sides can have the same or different construction and can be overcoated with the same or different protective layers.

It is also contemplated that the photothermographic materials used in this invention include thermally developable imaging (or emulsion) layers on both sides of the support and at least one infrared radiation absorbing heat-bleachable composition in an antihalation underlayer beneath layers on one or both sides of the support.

Radiographic Imaging Assembly:

The radiographic imaging assemblies of the present invention are composed of a radiographic material as described herein and one or more phosphor screens of the present invention, arranged in such a manner that exposing X-radiation is directed through a patient and at least one of the screens to cause the emission of radiation that exposes the radiographic material.

Imaging and Processing:

Exposure and processing of the "wet" radiographic materials used in the practice of this invention can be undertaken in any convenient conventional manner. The exposure and processing techniques of U.S. Pat. No. 5,021,327 and U.S. Pat. No. 5,576,156 (both noted above) are typical for processing radiographic films. Other processing compositions (both developing and fixing compositions) are described in U.S. Pat. No. 5,738,979 (Fitterman et al.), U.S. Pat. No. 5,866,309 (Fitterman et al.), U.S. Pat. No. 5,871,890 (Fitterman et al.), U.S. Pat. No. 5,935,770 (Fitterman et al.), U.S. Pat. No. 5,942,378 (Fitterman et al.), all incorporated herein by reference. The processing compositions can be supplied as single- or multi-part formulations, and in concentrated form or as more diluted working strength solutions.

It is particularly desirable that the "wet" radiographic silver halide films be processed within 90 seconds ("dry-to-dry") and preferably within 45 seconds and at least 20 seconds, for the developing, fixing and any washing (or rinsing) steps. Such processing can be carried out in any suitable processing equipment including but not limited to, a Kodak X-OMAT® RA 480 processor that can utilize Kodak Rapid Access processing chemistry. Other "rapid access processors" are described for example in U.S. Pat. No. 3,545,971 (Barnes et al.) and EP 0 248,390A1 (Akio et al.). Preferably, the black-and-white developing compositions used during processing are free of any gelatin hardeners, such as glutaraldehyde.

"Dry" radiographic materials useful in the present invention can be imaged in any suitable manner consistent with the type of material using any suitable imaging source (typically some type of radiation or electronic signal) to which they are sensitive. The materials can be made sensitive to X-radiation or radiation in the ultraviolet region of the spectrum, the visible region of the spectrum, or the infrared region of the electromagnetic spectrum.

Useful X-radiation imaging sources include general medical, mammographic, dental, industrial X-ray units, and other X-radiation generating equipment known to one skilled in the art. Exposure to visible light can be achieved using conventional spectrophotometers, xenon or tungsten flash lamps, or other incandescent light sources; Exposure to infrared radiation can be achieved using any source of infrared radiation, including an infrared laser, an infrared laser diode, an infrared light-emitting diode, an infrared lamp, or any other infrared radiation source readily apparent to one skilled in the art, and others described in the art.

Thermal development conditions will vary, depending on the construction used but will typically involve heating the imagewise exposed material at a suitably elevated temperature. Thus, the latent image can be developed by heating the exposed material at a moderately elevated temperature of, for example, from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means such as a hot plate, a steam iron, a hot roller or a heating bath.

The following examples are presented for illustration and the invention is not to be interpreted as limited thereby.

EXAMPLE 1

Phosphor Screen Containing Reflective Substrate

A three-layered support comprising a microvoided poly (lactic acid) layer is formed in the middle of two barium sulfate-containing reflective substrates was prepared in the following manner. The materials used in the preparation were:

1) a poly(lactic acid) resin (NatureWorks 2002-D by Cargill-Dow) and polypropylene ("PP", Huntsman P4G2Z-073AX) were dry blended at a weight ratio 4:1 for the middle layer,
2) a compounded blend for the top and bottom reflective substrates consisting of 44% by weight of poly(lactic acid) resin (NatureWorks 2002-D by Cargill-Dow) and 56% by weight of barium sulfate particles (Blanc Fixe XR from Sachtleben) with a mean particle size of 0.8 $\mu$m.

The barium sulfate particles were compounded with the PLA resin by mixing in a counter-rotating twin-screw extruder attached to a pelletizing die. The extrudate was passed through a water bath and pelletized.

The dry blended resin for the middle microvoided PLA layer and the compounded resin for the upper and lower layers were dried at 50° C. and fed by two plasticating screw extruders into a co-extrusion die manifold to produce a three-layered melt stream that was rapidly quenched on a chill roll after exiting from the die. By regulating the rate of extrusion, it was possible to adjust the thickness ratio of the three layers in the cast laminate sheet. In this case, the thickness ratio of the three layers was adjusted at 1:2:1 with the thickness of the two outside layers being approximately 300 $\mu$m. The cast three-layer sheet was first oriented in the machine direction by stretching at a ratio of 3.3 and a temperature of 84° C.

The oriented three-layer support was then stretched in the transverse direction in a tenter frame at a ratio of 3.3 and a temperature of 84° C. In this example, no heat setting treatment was applied. The final total film thickness was 225 $\mu$m with the top and bottom layers being 70 $\mu$m each, and the layers within the support were fully integrated and strongly bonded. The stretching of the heterogeneous top and bottom layers created convex microvoids around the hard $BaSO_4$ particles, thus rendering the reflective substrates opaque (white) and highly reflective. The middle PLA layer also had convex microvoids. These voids however were 10 to 20 times larger in all three dimensions than the microvoids in the upper and lower reflective substrates. This is due to the PP forming distinct particles in the continuous PLA phase of the core layer 10 to 20 times larger than the 0.8 $\mu$m barium sulfate particles in the upper and lower reflective substrates.

Before using the stretched sheet as a support in a phosphor screen, it (Support 1A) was evaluated for its reflectance properties and compared to a conventional support (Support 1B) comprised of poly(ethylene terephthalate) containing 5.8% rutile titania. Thus, Support 1B contained a conventional reflective pigment but did not contain microvoids. Both supports had a thickness of about 225 $\mu$m. Reflectance was measured by directed radiation of various wavelengths through the supports and measuring the amount of reflectance using a conventional reflectometer and calibrated reflectance standards. The results are shown in the following TABLE 1.

TABLE I

| | Reflectance (%) | |
|---|---|---|
| Wavelength (nm) | Support 1A (Invention) | Support 1B (Comparison) |
| 360 | 95.0 | 8.2 |
| 380 | 97.1 | 13.5 |
| 400 | 98.0 | 43.5 |
| 450 | 99.1 | 84.0 |
| 500 | 99.1 | 86.5 |
| 600 | 99.0 | 87.1 |
| 700 | 99.2 | 86.2 |

It can be seen from these data that the reflectance of Support 1A used in the practice of the present invention was significantly higher than that of the Control Support 1B over the entire 700 to 350 nm portion of the electromagnetic spectrum. At the shorter wavelengths, the reflectance of Support 1B was sharply reduced, following the known characteristic of white pigments being incapable of reflecting efficiently in all spectral regions. In contrast, Support 1A demonstrated very high reflectance at the shorter wavelengths (especially at 400 nm and below).

Phosphor screens were prepared and evaluated as described in Example 1 except that a different phosphor was used.

A dispersion was prepared employing a green-emitting, terbium-doped gadolinium oxysulfide phosphor with a mean particle size of 6.8 $\mu$M in the amount of 100 g of the phosphor in a solution prepared from 117 g of polyurethane binder (trademark Permuthane U-6366) at 10% (by weight) in a 93:7 volume ratio of dichloromethane and methanol.

The resulting dispersion was coated at a phosphor coverage of 663 g/m² on Support 1A (Invention) and 675 g/m² on Support 1B (Comparison) to provide Screens 1A (Invention) and 1B (Comparison).

For the sensitometric (speed) evaluation, a pair of Screens 1A and a pair of Screens 1B were each placed in contact on each side of a green-sensitive dual-coated radiographic film that is commercially sold under the trademark KODAK T-MAT® radiographic film. The resulting imaging assemblies (1A—Invention, 1B—Control) were exposed using an X-ray-based inverse square sensitometer using an 80 kVp X-ray beam using 0.5 mm copper and 1.0 mm aluminum sheets as filters. The relative speed of each imaging assembly was determined by comparing the exposures necessary to produce a density of 1.0 plus fog on the characteristic sensitometric curve.

For evaluation of sharpness, each imaging assembly was exposed using an X-ray beam at 80 kVp that was filtered using 0.5 mm copper and 1 mm aluminum sheets, and the radiation passed through a "bone and beads" test object containing bone, plastic objects, steel wool, and miscellaneous objects having fine detail. Image sharpness was visually compared for each imaging assembly.

Setting the relative speed of the film used with Screen 1B as 100, the film used with Screen 1A exhibited a relative speed of 120. The observed image sharpness produced by Imaging Assembly 1A was only slightly less than that provided by Imaging Assembly 1B. This again demonstrated the superiority of the phosphor screens of the present invention, taking both speed and image sharpness into consideration.

EXAMPLE 2

Another set of phosphor screens was coated in a similar manner. The dispersion described above was coated at a phosphor coverage of 950 g/m² on Support 1A and 1330 g/m² on Support 1B to give Screens 2A (Invention) and 2B (Comparison) respectively. When used in imaging assemblies and evaluated as described in Example 1, the phosphor screens showed equal speed despite Screen 2A having only 67% as much phosphor as was coated in Screen 2B. Image sharpness was again established by imaging "bone and beads" test object, but in this case only a single screen was used to generate the image with a radiographic film in the imaging assemblies. Images using Imaging Assembly 2A had noticeably improved sharpness when compared images obtained using Imaging Assembly 2B. Again, the ability to advantageously trade speed and image sharpness is obtained using the reflective supports described for this invention. In addition, the present invention allows one to obtain the same speed with reduced amount of phosphor. This can provide a considerable cost savings.

The invention has been described in detail with particular reference to certain preferred embodiments thereof, but it will be understood that variations and modifications can be effected within the spirit and scope of the invention.

| Parts List | |
|---|---|
| 10, 30, 50 | support |
| 11, 40 | reflective substrate |
| 12, 22, 28, 36, 44 | polyester phase |
| 14, 24, 38, 46 | microvoids |
| 16, 48 | barium sulfate particles |
| 18, 20, 26, 34 | adjacent layer |
| 32 | particles |
| 42 | second reflective substrate |

We claim:

1. A phosphor screen that comprises an inorganic phosphor capable of absorbing X-rays and emitting electromagnetic radiation having a wavelength greater than 300 nm, said inorganic phosphor being coated in admixture with a polymeric binder in a phosphor layer onto a flexible support, said flexible support comprising a reflective substrate comprising at least one layer comprising a continuous poly(lactic acid) first phase and a second phase dispersed within said continuous poly(lactic acid) first phase, said second phase comprised of microvoids containing barium sulfate particles.

2. The screen of claim 1 wherein said poly(lactic acid) first phase is a biaxially oriented poly(lactic acid).

3. The screen of claim 1 wherein the ratio of the reflective index of said poly(lactic acid) first phase to said second phase is from about 1.4:1 to about 1.6:1.

4. The screen of claim 1 wherein said support is capable of reflecting at least 90% of incident radiation having a wavelength of from about 300 to about 700 nm.

5. The screen of claim 1 wherein said microvoids occupy from about 35 to about 60% (by volume) of said reflective substrate.

6. The screen of claim 1 wherein said reflective support has a dry thickness of from about 75 to about 400 μm.

7. The screen of claim 1 wherein said poly(lactic acid) first phase is composed of at least 75% by weight of poly(L-lactic acid).

8. The screen of claim 1 wherein th e particles of barium sulfate have an average particle size of from about 0.6 to about 2 μm and comprise from about 23 to about 65 weight % of total substrate weight.

9. The screen of claim 1 wherein said phosphor is sensitive to electromagnetic radiation having a wavelength of from about 350 to about 450 nm.

10. The screen of claim 1 further comprising a transparent protective layer disposed over said phosphor layer.

11. The screen of claim 1 wherein said support further comprises a stretch microvoided polymer layer that is free of barium sulfate and arranged adjacent said reflective substrate opposite said phosphor layer.

12. The screen of claim 11 wherein said stretch microvoided polymer layer comprises microvoids in amount of from about 35 to about 60% (by volume).

13. The screen of claim 11 wherein said stretch microvoided polymer layer has a dry thickness of from about 30 to about 120 μm.

14. The screen of claim 11 wherein said stretch microvoided polymer layer is arranged directly adjacent said reflective substrate.

15. A radiographic imaging assembly comprising:

A) a photosensitive silver halide-containing film comprising a support having first and second major surfaces, said photosensitive silver halide-containing film having disposed on at least said first major support surface, one or more photosensitive emulsion layers, and B) a phosphor screen that comprises an inorganic phosphor capable of absorbing X-rays and emitting electromagnetic radiation having a wavelength greater than 300 nm, said inorganic phosphor being coated in admixture with a polymeric binder in a phosphor layer onto a flexible support, said flexible support comprising a reflective substrate comprising at least one layer comprising a continuous poly(lactic acid) first phase and a second phase dispersed within said continuous poly(lactic acid) first phase, said second phase comprised of microvoids containing barium sulfate particles.

16. The imaging assembly of claim 15 wherein said photosensitive silver halide-containing film is a dual-coated radiographic photographic film.

17. The imaging assembly of claim 15 wherein said photosensitive silver halide-containing film is a photosensitive thermally-developable film.

18. The imaging assembly of claim 17 wherein said photosensitive silver halide-containing film comprises a support having a photosensitive thermally-developable imaging layer on both sides of said support.

19. A method of providing a radiographic image comprising:

A) directing imaging X-radiation through a phosphor screen that comprises an inorganic phosphor capable of absorbing X-rays and emitting electromagnetic radiation having a wavelength greater than 300 mm, said inorganic phosphor being coated in admixture with a polymeric binder in a phosphor layer onto a flexible support, said flexible support comprising a reflective substrate comprising at least one layer comprising a continuous poly(lactic acid) first phase and a second phase dispersed within said continuous poly(lactic acid) first phase, said second phase comprised of microvoids containing barium sulfate particles, thereby causing said electromagnetic radiation to impinge on a photosensitive silver halide-containing film comprising a support having first and second major surfaces, said photosensitive silver halide-containing film having disposed on at least said first major support surface, one or more photosensitive emulsion layers, to form a latent image in said film, and B) developing said latent image in said film.

20. The method of claim 19 wherein said photosensitive silver halide-containing film is a "wet" processable radiographic film and said latent image is developed using wet processing solutions.

21. The method of claim 19 wherein said photosensitive silver halide-containing film is a "dry" thermally-developable film and said latent image is developed using thermal energy.

* * * * *